US007107597B2

(12) United States Patent
Shappir et al.

(10) Patent No.: US 7,107,597 B2
(45) Date of Patent: Sep. 12, 2006

(54) METHOD OF AND SYSTEM FOR CONTROLLING TASK-ORIENTED SYSTEMS UTILIZING AN APPLICATION PROGRAMMING INTERFACE

(75) Inventors: Dan Shappir, Tel-Aviv (IL); Eran Heyman, Closter, NJ (US)

(73) Assignee: Ericom Software 8 2001 Ltd., Jerusalem (IL)

( * ) Notice: Subject to any disclaimer, the term of this patent is extended or adjusted under 35 U.S.C. 154(b) by 593 days.

(21) Appl. No.: 09/948,599

(22) Filed: Sep. 10, 2001

(65) Prior Publication Data
US 2003/0051070 A1    Mar. 13, 2003

(51) Int. Cl.
*G06F 9/46*   (2006.01)
(52) U.S. Cl. .......................................... 719/328; 707/1
(58) Field of Classification Search ............... 719/328; 707/1
See application file for complete search history.

(56) References Cited
U.S. PATENT DOCUMENTS 6,009,476 A * 12/1999 Flory et al. ................. 719/324
6,014,702 A * 1/2000 King et al. .................. 709/227
6,049,832 A * 4/2000 Brim et al. .................. 709/237
6,205,417 B1 * 3/2001 Butts et al. .................... 703/27
6,304,274 B1 * 10/2001 Brokenshire ................ 345/443
6,487,590 B1 * 11/2002 Foley et al. ................. 709/223
6,496,864 B1 * 12/2002 McCartney ................. 709/226
6,519,605 B1 * 2/2003 Gilgen et al. ........... 707/103 R
6,611,591 B1 * 8/2003 McNiff et al. ............... 379/268
6,735,773 B1 * 5/2004 Trinh et al. ................. 719/328
6,823,522 B1 * 11/2004 Lamb .......................... 719/316
2001/0032183 A1 * 10/2001 Landry .......................... 705/40

OTHER PUBLICATIONS

Ryan K. Stephens, Sams Teach Yourself SQL, 1999, Third Edition, pp. 11, 15, 27, 37, 104, 192 and 525.*

* cited by examiner

*Primary Examiner*—William Thomson
*Assistant Examiner*—Andy Ho
(74) *Attorney, Agent, or Firm*—Mark M. Friedman

(57) ABSTRACT

A method of, and system for, using a high-level, task-oriented Application Programming Interface (API) to access a legacy system, the method including the steps of: (a) providing the legacy system, including emulation software for accessing the legacy system; (b) operating a low level API over the emulation software; (c) operating the high-level, task-oriented application programming interface over the low level API, and (d) implementing database access protocol emulation over the high-level API.

33 Claims, 4 Drawing Sheets

METHOD OF AND SYSTEM FOR CONTROLLING TASK-ORIENTED SYSTEMS UTILIZING AN APPLICATION PROGRAMMING INTERFACE

FIELD AND BACKGROUND OF THE INVENTION

The present invention relates to a method for providing an Application Programming Interface (API) to existing applications that do not provide this service without modifying their internal operation. Moreover, this API is constructed in such a way that these applications appear to behave as standard Database Management Systems (DBMS). This makes such applications easily controllable from external software, allowing for task automation and also allowing them to participate in cross-application operations such as transactions.

Many modern applications provide programmatic access to the functionality they implement via an Application Programming Interface (API). By allowing this type of access, an API enables automation of common tasks and facilitates integration between disparate applications. Many older, a.k.a. legacy, applications do not provide an API. This deficiency is particularly glaring because these applications often stand to benefit the most from an API. The benefits, which are manifestly evident, include the following:

1. Having withstood the test of time, these are often applications that are at the core of an enterprise's business process.
2. New systems that have been installed since the legacy applications can benefit from integration therewith, and vice versa.
3. Legacy applications often run on legacy hardware, which makes external access to the data difficult.
4. Source code for legacy applications may be in an outdated programming language, or missing altogether. This makes it very difficult to reproduce the business logic that has been encapsulated in the legacy applications.
5. For the same reason, adding new functionality to such applications can also be difficult, impractical, or substantially impossible.

Another type of applications in which an API is generally not exposed at the client side is web applications. These applications run on a central server (web server) and expose their user-interface via a web browser. Such applications can also greatly benefit from an API because:

1. They may be running outside the enterprise, as a service provided by an external provider via the Internet, such as an Application Service Provider (ASP). In this case access to or modification of their source code may be impossible.
2. For the same reason, direct access to the data may also be impossible.
3. Because these applications were generally built to be accessed by a human via the web browser, it may be difficult to integrate them into the business process of an enterprise.

It is possible to graft an API on top of legacy applications without modifying the internal structure of these applications. Such systems are often accessed via specialized hardware (terminals). Over the past several years, this hardware has been replaced by software applications that emulate the behavior of the hardware on modem systems. By building an API into the emulation software, it is possible to achieve most of the same benefits as an API on the original legacy application itself. In the case of web applications, the solution is very similar: creating an application that emulates the browser's behavior and also provides an API.

A useful API must be easily usable from common programming environments/programming languages. In addition, the API should provide a development model that is familiar to users and exposes logical units that match the processes (tasks) that the users wish to perform.

There is therefore a recognized need for, and it would be highly advantageous to have, a method for providing high-level application programming interface for legacy systems that is user-friendly, universal, and adaptable to client applications such as web servers. It would be of further advantage if such a method would support most software, hardware and network configurations.

SUMMARY OF THE INVENTION

According to the present invention, there is provided a method of using a high-level, task-oriented Application Programming Interface (API) to access a legacy system, the method including the steps of: (a) providing the legacy system, including emulation software for accessing the legacy system; (b) operating a low level API over the emulation software; (c) operating the high-level, task-oriented application programming interface over the low level API, and (d) implementing database access protocol emulation over the high-level API.

According to another aspect of the present invention, there is provided a system for using a high-level, task-oriented Application Programming Interface (API) to access a legacy system, the system comprising: (a) emulation software for accessing the legacy system; (b) a low level API for operating over said emulation software; (c) a high-level, task-oriented application programming interface for operating over said low level API, and (d) a database access protocol emulation for implementing over said high-level API.

According to another aspect of the present invention, there is provided a method of using an API to access a task-oriented system, the method comprising the steps of: (a) providing the task-oriented system; (b) operating the API over said system, and (c) implementing database access protocol emulation over the API.

According to another embodiment of the present invention, the method further includes the step of: retrieving data from the legacy system using the database access protocol emulation.

According to another embodiment of the present invention, the method further includes the step of: presenting the retrieved data in the form of a collection of database records according to the rules of the database access protocol.

According to another embodiment of the present invention, the method further includes the step of: performing at least one operation on the legacy system using the database access protocol emulation prior to retrieving the data from the legacy system.

According to another embodiment of the present invention, the method further includes the step of (f) performing at least one operation on the legacy system by manipulating the collection of database records in the form of adding, updating or deleting records.

According to another embodiment of the present invention, the data retrieval is accomplished by applying a plurality of linguistic rules.

According to another embodiment of the present invention, the performing of the operation is accomplished by applying a plurality of linguistic rules According to another embodiment of the present invention, the plurality of linguistic rules includes a Structured Query Language (SQL) syntax.

According to another embodiment of the present invention, the method further includes the step of: accessing a plurality of logic units in the legacy system, the accessing including addressing the plurality as a plurality of stored procedures in a data base management system.

According to another embodiment of the present invention, the method further includes the step of: forwarding arguments to the operations and returning results thereof as a collection of database records.

According to another embodiment of the present invention, the format is a format of stored procedures.

According to another embodiment of the present invention, the SQL syntax includes a SELECT statement.

According to another embodiment of the present invention, the SELECT statement supports record filtering using a WHERE modifier.

According to another embodiment of the present invention, the record filtering is performed by the legacy system.

According to another embodiment of the present invention, the record filtering is performed by a database access emulation layer.

According to another embodiment of the present invention, the SELECT statement supports record ordering using an ORDER BY modifier.

According to another embodiment of the present invention, the record ordering is performed by the legacy system.

According to another embodiment of the present invention, the record ordering is performed by a database access emulation layer.

According to another embodiment of the present invention, the SELECT statement supports relational algebraic operations, including but not limited to JOIN, SELECT and PROJECT.

According to another embodiment of the present invention, the relational algebraic operations are selected from the group consisting of: JOIN, SELECT and PROJECT.

According to another embodiment of the present invention, the operations of the legacy system generate data, and the method further includes the step of: assigning a name of each of the operations to a name of a table of the data.

According to another embodiment of the present invention, the operations of the legacy system generate data, and the method further includes the step of: assigning a name of each of the operations to a name of a view of the data.

According to another embodiment of the present invention, a plurality of operations including inserting, updating and removing information on the legacy system is accomplished by applying a plurality of linguistic rules.

According to another embodiment of the present invention, the plurality of linguistic rules includes an SQL syntax.

According to another embodiment of the present invention, the method further includes the step of: configuring the legacy system for participation in a transaction processing environment in conjunction with a plurality of applications.

According to another embodiment of the present invention, the applications include dissimilar applications.

According to another embodiment of the present invention, the manipulation is orchestrated by a transaction server.

According to another embodiment of the present invention, the method further includes the step of: performing operations on a group of systems selected from the group consisting of: task-oriented and screen-oriented systems.

According to another embodiment of the present invention, the group of systems includes web server, web service, and eXtensible Markup Language, According to another embodiment of the present invention, the group of systems includes applications on Microsoft Windows™, applications on MS DOS®, and applications on UNIX X-Windows™.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4b is a schematic illustration of an automatic reservation and information transfer system according to one aspect of the present invention, using the travel reservation system and legacy host of FIG. 4a.

DESCRIPTION OF THE PREFERRED EMBODIMENTS

Figure 1:
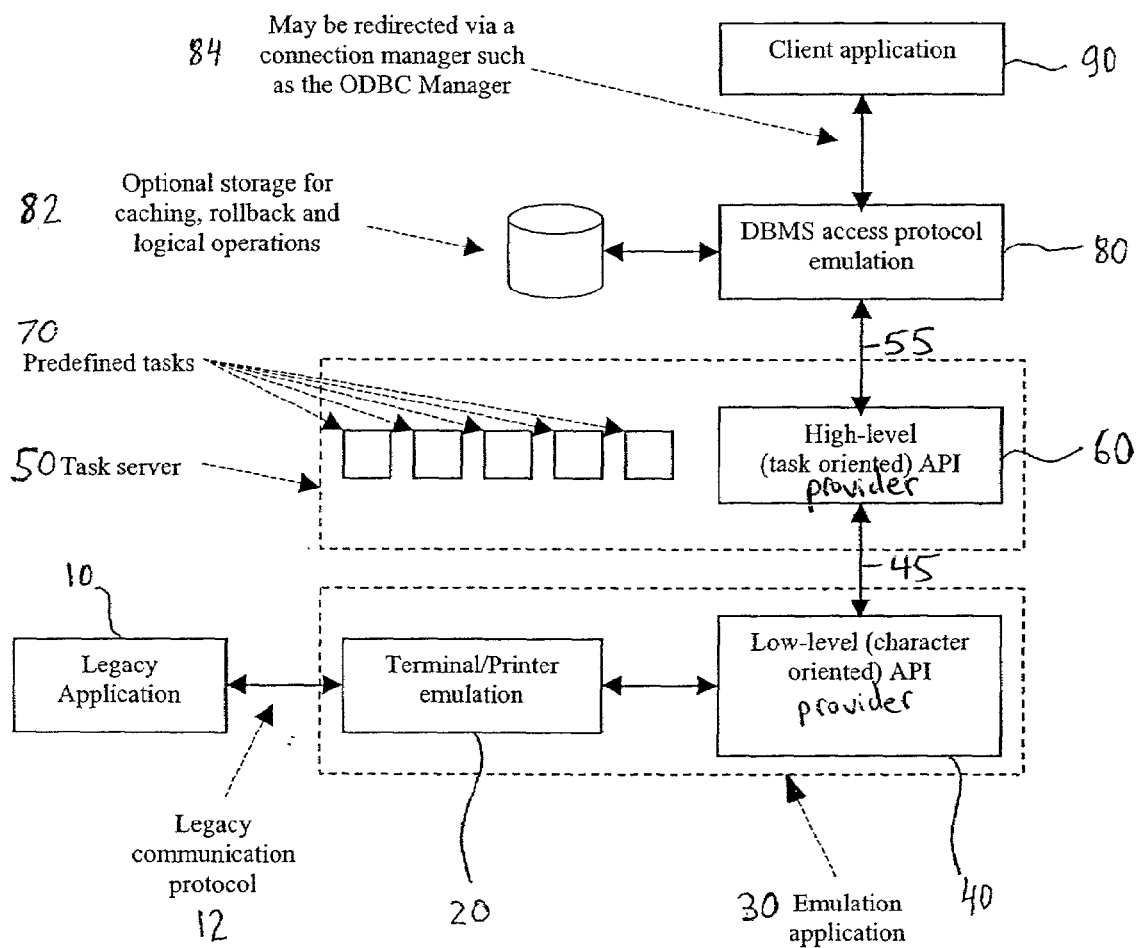
FIG. 1 is a block diagram illustrating an embodiment of a legacy system utilization via an application programming interface according to the present invention.

The method of the invention provides an API that is modeled after the common DBMS access methodologies including, but not limited to, Open Database Connectivity (ODBC), Java Database Connectivity (JDBC), Object Linking and Embedding Database (OLE DB), ActiveX Data Object (ADO) and eXtensible Markup Language (XML)-based data access methodologies. These are widely used APIs, very well documented and familiar to many users. Also, many development environments (e.g., Microsoft Visual Studio, IBM Visual Age) provide intrinsic support for database access protocols and many third-party components and tools are also available for them.

An API provides programmatic access to functionality implemented by an application. It does this by exposing a set of methods that an external program can invoke. For this to work, the methods must be implemented in such a way that they support invocation across process or even machine boundaries. This is required because the client program is usually a separate entity form the application that provides the API. In addition, a common set of data types must be defined so that values can be passed between the client of the API and its provider.

Because of these requirements, common frameworks for implementing APIs have evolved. They include RPC, COM, CORBA, SOAP and others. Such frameworks define a common type system and also provide an infrastructure for Remote Procedure Calls (RPC) or other forms of Inter Process Communication (IPC). Above these frameworks, common usage protocols have evolved. Such protocols define standard sets of functions, task specific data-types and, in the case of object oriented frameworks, standard objects and interfaces. Using a common protocol provides several benefits:

1. It is much more likely that the model will be familiar to the API's user, thus lowering the learning curve and reducing the likelihood of errors.
2. Distinct components that support the same protocol are much easier to integrate.
3. Development is facilitated by intrinsic support for the protocol in existing development environments and the availability of third-party components and tools.

Some of the most common API protocols have to do with access to DBMS. These protocols abstract the relationship between the DBMS and the applications that manage and display the data stored within it. Thus, the same application can run unchanged on top of several distinct databases that may not even be from the same vendor (e.g., IBM DB2, Oracle9i, Microsoft SQL Server). Most of these APIs are centered on the Structured Query Language (SQL). However, they can also be used to invoke stored-procedures that are pre-built routines hosted in the DBMS. Such routines represent predefined business-logic units that can be activated to perform complete tasks.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As used herein in the specification and in the claims section that follows, the term "Low-level API" refers to an Application Programming Interface that enables interaction with a host system by providing facilities for sending simulated keystrokes and reading characters of a virtual screen. The Low-level API also provides synchronization primitives for coordinating operations with screen events such as cursor positioning. Several standards exist for this type of API including HLLAPI, EHLLAPI and OHIO.

As used herein in the specification and in the claims section that follows, the term "High-level API" refers to an Application Programming Interface that enables activation of operational tasks and transactions within the target system. A single API method call may activate a complete task, where the task is specified by a logical identifier. Arguments and return values are provided using logical data types such as numbers, dates, and arrays of values.

As used herein in the specification and in the claims section that follows, the term "protocol" refers to an agreed-upon format for transferring information, both data and commands, between two or more end-points. In the context of an API, a protocol defines a task-specific collection of data-types and functions. Adhering to such a protocol guarantees proper communication between the provider of the API and clients thereof.

As used herein in the specification and in the claims section that follows, the term "Structured Query Language (SQL) syntax" is used generally to refer to an SQL syntax, or to any subset or variant thereof, such as Transact-SQL (T-SQL).

Referring now to the drawings, FIG. 1 is a block diagram illustrating a method according to the present invention. A legacy application 10, which could be a standalone Alpha/OpenVMS system, is connected to an emulation application 30. Emulation application 30 is a low-level API provider 40 that contains a terminal emulation component 20 and a low-level API 45. The connection between legacy application 10 and low-level API provider 40 is accomplished via terminal emulation component 20. Legacy application 10 communicates with terminal emulation component 20 by a legacy communication protocol 12. A task server 50 containing a high-level, task-oriented, API provider 60 enables access to predefined tasks 70 and is connected to emulation application 30 through low-level API 45. An application 80 emulates a database management system access protocol for running task server 50 over a high-level API 55. Optionally, application 80 has an optional memory storage 82 for caching, rollback and logical operations. Rollback operations are required in cases where operations need to be undone after they have been successfully completed. This is a requirement when the application is integrated with other applications in a manner that requires transactional integrity across the entire system. In such cases failed operations in other applications will necessitate a rollback.

A client application 90 manages DBMS emulation application 80 by a connection manager 84 that may optionally be an Open Data Base Connectivity (ODBC) Manager, a common type of software.

Figure 2:
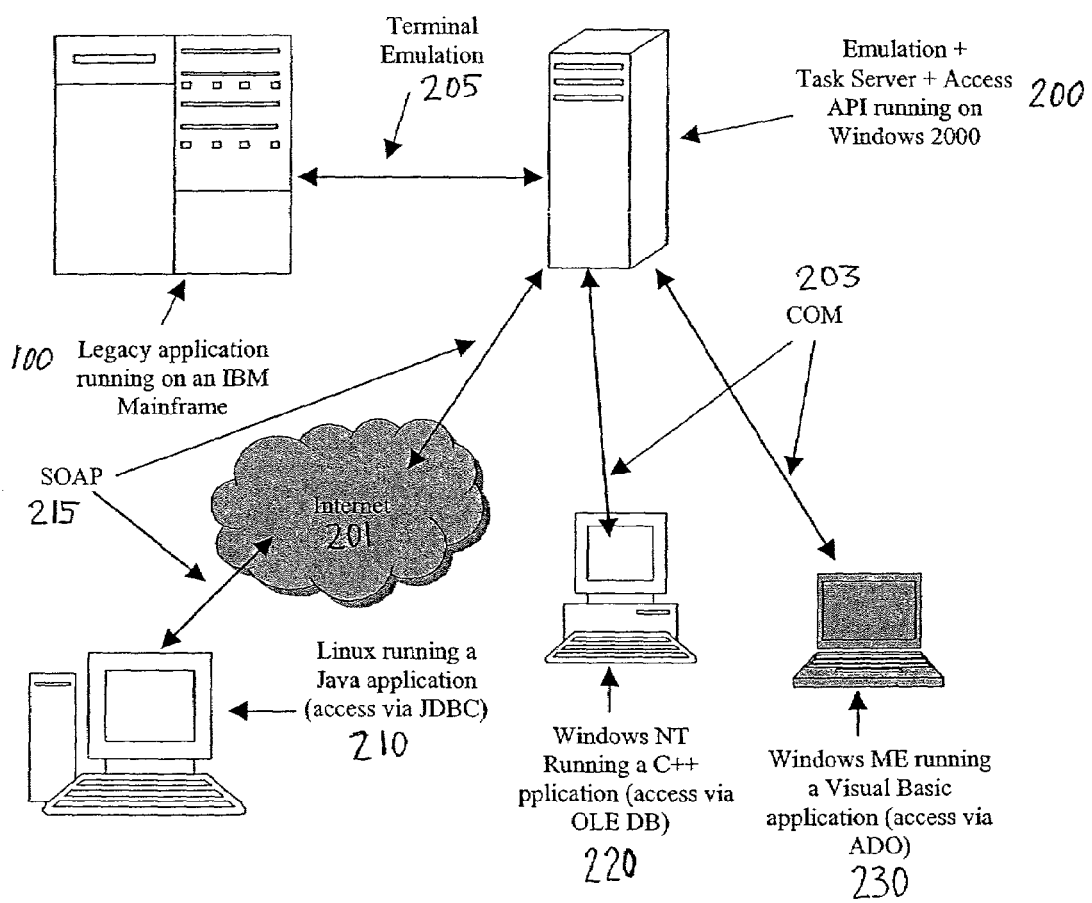
FIG. 2 is a block diagram of the method the invention applied to a system incorporating heterogeneous hardware, applications and connection configuration.

FIG. 2 shows one embodiment of a method in the invention, where task server 50 and emulation/access API-based application 30, illustrated in FIG. 1, are resident on a Windows 2000 server 200. Server 200 is operatively connected by terminal emulation to a legacy application 100 running on an IBM mainframe. The resultant API-managed configuration allows diverse workstations to access legacy application 100. These workstations include, by way of example, Windows ME running a Visual Basic application workstation 230, having Windows ME running a Visual Basic application, an ADO protocol-type access, and workstation 220 running Windows NT with a C++ application. Workstations 220 and 230 communicate with server 200 using OLE DB over the COM binary code protocol 203 of Microsoft. Workstation 210 has a Java application supported by a JDBC protocol running on a LINUX shell, connects to server 200 by means of a SOAP-based Internet 201 connection.

Figure 3A:
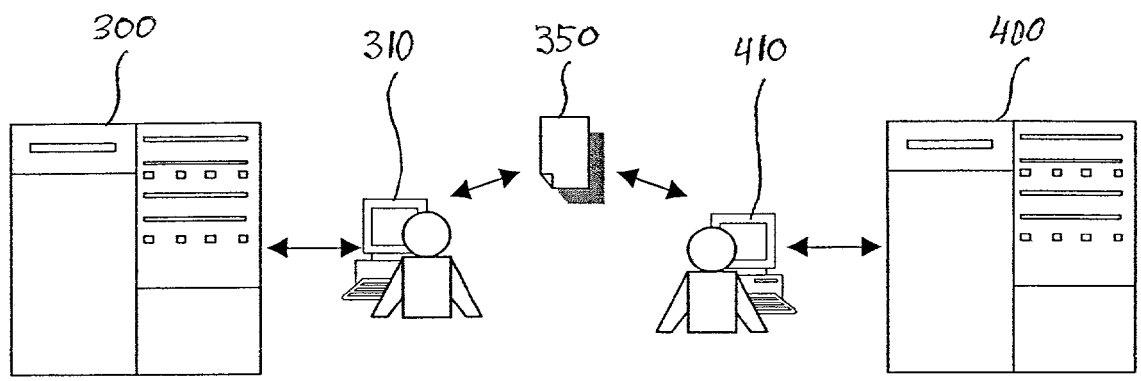
FIG. 3a is a block diagram illustrating a necessitated manual transfer of information between disconnected systems.

FIG. 3a illustrates a configuration according to prior art. Legacy systems 300 and 400, incompatible in design and operation, have workstations 310 and 410, respectively. A user 415 working on workstation 410 has generated a report 350. User 415 can forward report 350 to a user 315 at workstation 310 only by sending a hard copy, or, at best, using electronic mail.

Figure 3B:
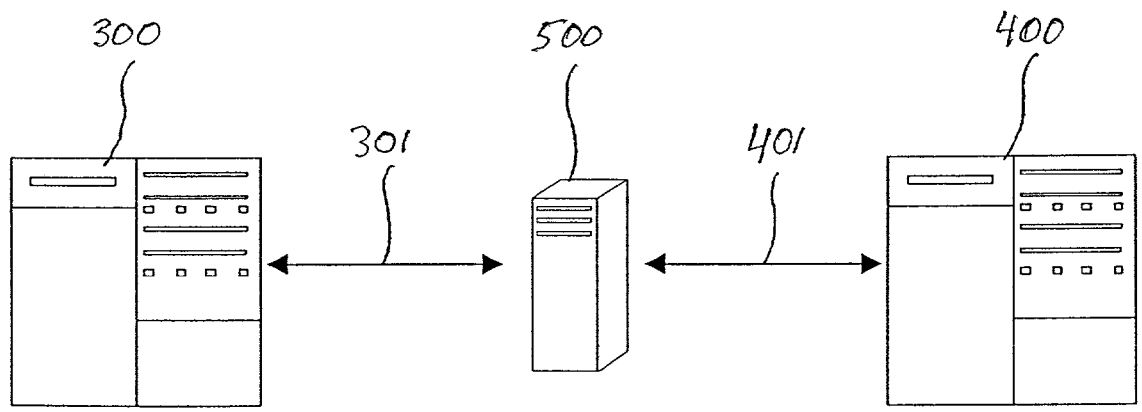
FIG. 3b is a block diagram illustrating an automatic information transfer between systems via transaction servers supported by an application programming interface layer.

In FIG. 3b, incompatible legacy systems 300 and 400 are directly interfaced using a server 500 incorporating an API-based emulation task server (server 200 in FIG. 2). Using terminal emulation connections 301 and 401, respectively, systems 300 and 400 automatically exchange data in real time, the operations managed by server 500.

EXAMPLE 1

Prior Art

Figure 4A:
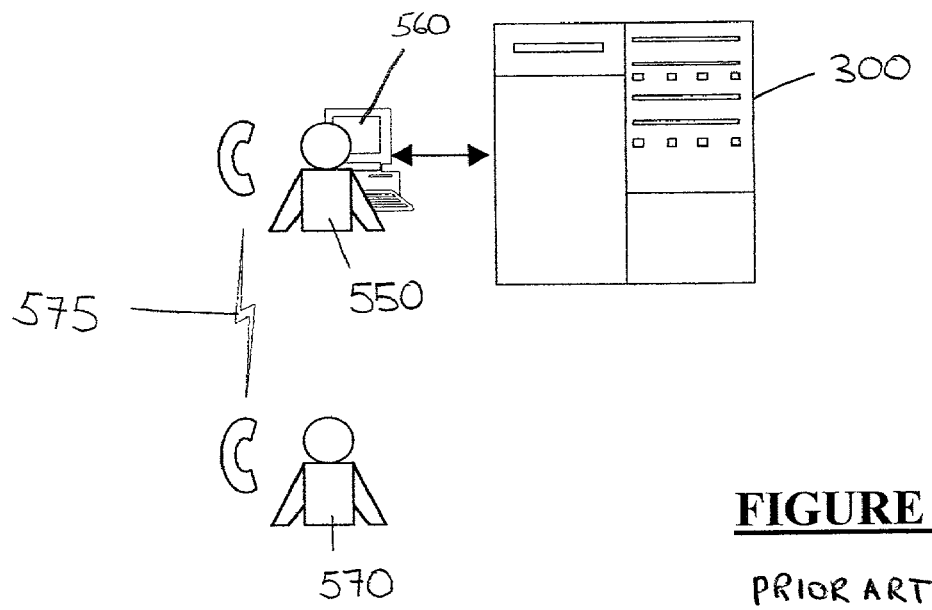
FIG. 4a is a schematic illustration of a method of making reservations using a travel reservation system running as an application on a legacy host, according to a method of the prior art.

FIG. 4a is a schematic illustration of a method of making a reservation using a travel reservation system running as an application on a legacy host 300, according to a method of the prior art. The application is accessed by trained personnel 550 via dedicated terminals 560. Customers 570 make reservations by providing the required information via telephone connection 575. This information is then entered manually into the reservation system. This configuration is expensive, error-prone and potentially frustrating to the customer because of the lack of visual feedback. In addition, it places significant limitation on growth, because of the restrictions on the number of personnel handling customer calls, and the number of calls that can be handled by such personnel during any given time period.

EXAMPLE 2

Figure 4B:
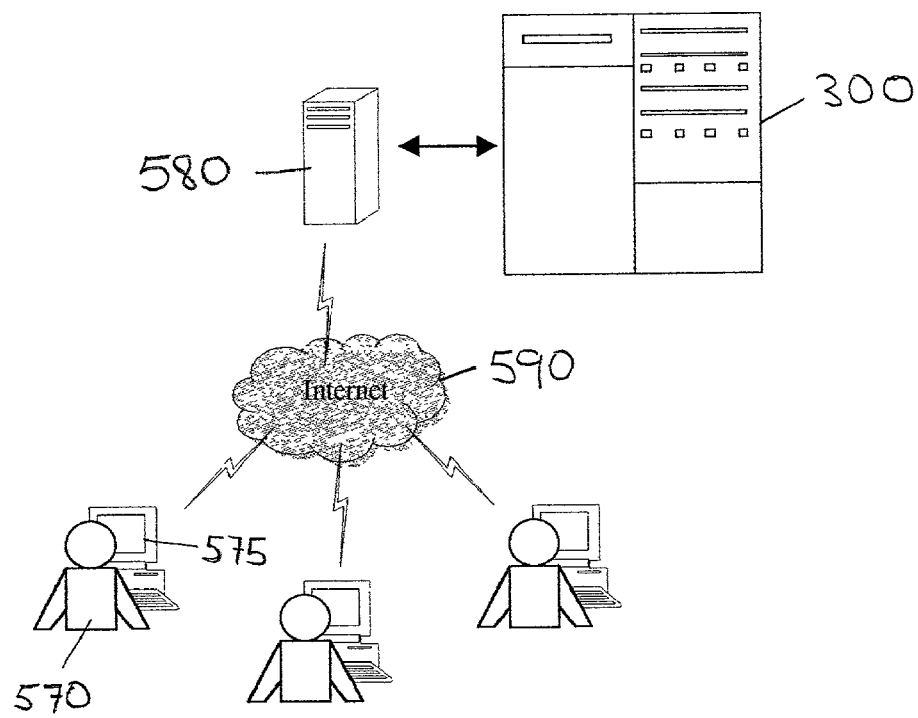

In the system and method of the present invention, the travel reservation system running on legacy host 300 is accessed through an API by an application running on top of a web-server 580, as shown in FIG. 4b. Customers 570 communicate with the travel reservation system, using a computer 575, via Internet 590. Customers 570 make reservations by providing the required information (name, address, desired travel dates and times, passport no., credit card information, etc.) by filling out a web form and submitting the form to the travel reservation system. Optionally and preferably, time schedules, fare information, and the like can be retrieved directly by customers 570. To web-server 580, the travel reservation running on the legacy system appears to be a DBMS, such that standard programs and techniques can be used, instead of cumbersome, expensive, and generally inflexible customized software. Consequently, the communication between web-server 580 and the travel reservation system is simple, routine, and robust. The present invention requires significantly less customized programming than other "automatic" systems using conventional technology (e.g., web-server 580 accessing the travel reservation system and performing operations directly through a low-level, character-oriented API).

The above-described application provides immediate access to the legacy system services for customers having access to the Internet. The resulting configuration is cheaper, faster and much more scalable than the original, prior-art configuration.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications mentioned in this specification are herein incorporated in their entirety by reference into the specification, to the same extent as if each individual publication, patent or patent application was specifically and individually indicated to be incorporated herein by reference. In addition, citation or identification of any reference in this application shall be construed as an admission that such reference is available as prior art to the present invention.

What is claimed is:

1. A computer-implemented method of using a high-level, task-oriented Application Programming Interface (API) to access a legacy system, the method comprising the steps of:
   (a) providing the legacy system, including emulation software for accessing the legacy system;
   (b) operating a low level API over said emulation software;
   (c) operating the high-level, task-oriented application programming interface over said low level API, so as to perform at least one task, wherein each said task is specified by a logical identifier, and
   (d) implementing a database management system (DBMS) access protocol emulation over said high-level API.

2. The method of claim 1, wherein said low level API is part of the legacy system.

3. The method of claim 1, further comprising the step of:
   (e) retrieving data from the legacy system using said DBMS access protocol emulation.

4. The method of claim 1, further comprising the step of:
   (f) presenting data retrieved from the legacy system as a collection of database records according to rules of said DBMS access protocol.

5. The method of claim 4, further comprising the step of:
   (f) performing at least one operation on the legacy system using said DBMS access protocol emulation prior to retrieving said data from the legacy system.

6. The method of claim 4, further comprising the step of:
   (f) performing at least one operation on the legacy system by manipulating said collection of database records.

7. The method of claim 6, wherein said manipulating includes at least one operation selected from the group consisting of adding, updating and deleting records.

8. The method of claim 4, wherein said retrieving data is accomplished by applying a plurality of linguistic rules.

9. The method of claim 5, wherein said performing of said operation is accomplished by applying a plurality of linguistic rules.

10. The method of claim 9, wherein said plurality of linguistic rules includes a Structured Query Language (SQL) syntax.

11. The method of claim 5, further comprising the step of:
    (g) accessing a plurality of logic units in the legacy system, said accessing including addressing said plurality as a plurality of stored procedures in a data base management system.

12. The method of claim 11, further comprising the step of:
    (h) forwarding arguments to said operation and returning results thereof as a collection of database records.

13. The method of claim 12, wherein said forwarding arguments and said returning results are in a format of SQL stored procedures.

14. The method of claim 10, wherein said SQL syntax includes a SELECT statement.

15. The method of claim 14, wherein said SELECT statement supports record filtering using a WHERE modifier.

16. The method of claim 15, wherein said record filtering is performed by the legacy system.

17. The method of claim 15, wherein said record filtering is performed by a DBMS access emulation layer.

18. The method of claim 14, wherein said SELECT statement supports record ordering using an ORDER BY modifier.

19. The method of claim 18, wherein said record ordering is performed by the legacy system.

20. The method of claim 18, wherein said record ordering is performed by a DBMS access emulation layer.

21. The method of claim 14, wherein said SELECT statement supports relational algebraic operations, including but not limited to JOIN, SELECT and PROJECT.

22. The method of claim 21, wherein said relational algebraic operations are selected from the group consisting of: JOIN, SELECT and PROJECT.

23. The method of claim 14, wherein at least one retrieval operation on the legacy system generates data, the method further comprising the step of:
   (g) assigning a name of each said retrieval operation to a name of a table of said data.

24. The method of claim 14, wherein at least one retrieval operation on the legacy system generates data, the method further comprising the step of:
   (g) assigning a name of each said retrieval operation to a name of a view of said data.

25. The method of claim 23, wherein a plurality of operations including inserting, updating and removing information on said legacy system is accomplished by applying a plurality of linguistic rules.

26. The method of claim 25, wherein said plurality of linguistic rules includes an SQL syntax.

27. The method of claim 1, further comprising the step of:
   (e) configuring the legacy system for participation in a transaction processing environment in conjunction with a plurality of applications.

28. The method of claim 27, wherein said applications include dissimilar applications.

29. The method of claim 27, wherein said manipulation is orchestrated by a transaction server.

30. The method of claim 2, further comprising the step of:
   (e) performing operations on a group of systems selected from the group consisting of task-oriented and screen-oriented systems.

31. The method of claim 30, wherein said group of systems includes applications on MS DOS®, applications on Microsoft Windows™, and applications on UNIX Windows™.

32. The method of claim 30, wherein said group of systems includes a web server.

33. A computer system for using a high-level, task-oriented Application Programming Interface (API) to access a legacy system, the system comprising:
   (a) emulation software for accessing the legacy system;
   (b) a low level API for operating over said emulation software;
   (c) a high-level, task-oriented application programming interface for operating over said low level API, said interface configured so as to perform at least one task, wherein each said task is specified by a logical identifier, and
   (d) a DBMS access protocol emulator, said emulator for performing DBMS access protocol emulation, said emulation for implementing over said high-level API. API.

* * * * *